United States Patent [19]
Yokoi

[11] 3,868,001
[45] Feb. 25, 1975

[54] WHEEL CYLINDER IN A HYDRAULIC BRAKE SYSTEM OF A VEHICLE

[75] Inventor: Masatada Yokoi, Kariya, Japan

[73] Assignees: Aisin Seiki Kabushiki Kaisha, Kariya-shi; Aichi-ken, both of, Japan

[22] Filed: Dec. 8, 1970

[21] Appl. No.: 96,166

[30] Foreign Application Priority Data
Dec. 12, 1969 Japan.............................. 44-00464

[52] U.S. Cl.................... 188/345, 92/75, 188/72.4, 188/370
[51] Int. Cl............................................ B60t 11/10
[58] Field of Search........ 188/106 P, 345, 364, 370, 188/72.4, 725; 60/54.5 E, 54.6 E, 54.6 M; 92/163, 164, 75

[56] References Cited
UNITED STATES PATENTS 3,403,602 10/1968 Brandon, Jr. .................. 188/345 X
3,486,591 12/1969 Scheffler.......................... 188/345 X
3,490,565 1/1970 Marschall..................... 188/106 P X FOREIGN PATENTS OR APPLICATIONS
951,906 3/1964 Great Britain...................... 188/345

Primary Examiner—George E. A. Halvosa
Attorney, Agent, or Firm—Holman & Stern

[57] ABSTRACT

A wheel cylinder in a hydraulic brake system of a vehicle, in which there is at least one piston and a cylinder, with said piston and cylinder serving as members which form two pressure chambers in the wheel cylinder, said piston or cylinder being operated by pressure generated in the pressure chambers, and each of said members being provided with oil-tight sliding portions thereon which are overlapped, thereby shortening the whole length of the wheel cylinder.

6 Claims, 6 Drawing Figures

WHEEL CYLINDER IN A HYDRAULIC BRAKE SYSTEM OF A VEHICLE

BACKGROUND OF THE INVENTION

The present invention relates to a wheel cylinder in a hydraulic brake system of a vehicle and more particularly in a hydraulic brake system of an automobile.

As for a wheel cylinder for a hydraulic dual brake system assigned in a vehicle and more particularly in an automobile, it has been well known to use a so-called rigid type wheel cylinder in which two pressure chambers are independently provided, each of which is arranged for each respective hydraulic system so as to eliminate an oil loss when any one of the dual systems is broken. However, in this conventional wheel cylinder, in order to compensate for a worn quantity of a friction pad or a brake shoe lining, said worn quantity being caused during a period from time of newly use to time of disuse thereof, a piston, in which its sliding portion separating the two pressure chambers is made longer by as much as a length corresponding to said worn quantity, is employed thereby to keep the responding to said worn quantity, is employed thereby to keep the two pressure chambers oil-tight until the piston is disused. It is essential condition for the rigid type wheel cylinder to provide the sliding portion of said length. Accordingly, the wheel cylinder of this type is made excessively longer, which results in increment of weight. This fact is contrary to such requirement of the system that the brake assembly should be small and light so as to facilitate the installation of the brake assembly into a narrow space provided in the vehicle, thereby to make lighter the weight of the members arranged under the spring device of the vehicle.

SUMMARY OF THE INVENTION

It is therefore a primary object of the present invention to provide a hydraulic brake wheel cylinder for a vehicle and more particularly for an automobile, in which sliding portions thereof are so designed that one of the sliding portions can enter the wall portion of a cylinder or two sliding portions can be slidably entered, whereby the whole length of the wheel cylinder is shortened by as much as a length corresponding to the thus entered sliding portion, so that a brake device can be made smaller and the weight of the members under the spring device of an automobile can be made lighter, as compared with a conventional one.

BRIEF DESCRIPTION OF THE DRAWINGS

The invention will be better understood from the following description taken in connection with the accompanying drawings in which the same or equivalent members are indicated by the same numerals with added characters a, b, c, and d, respectively.

DETAILED DESCRIPTION OF THE INVENTION

Figure 1:
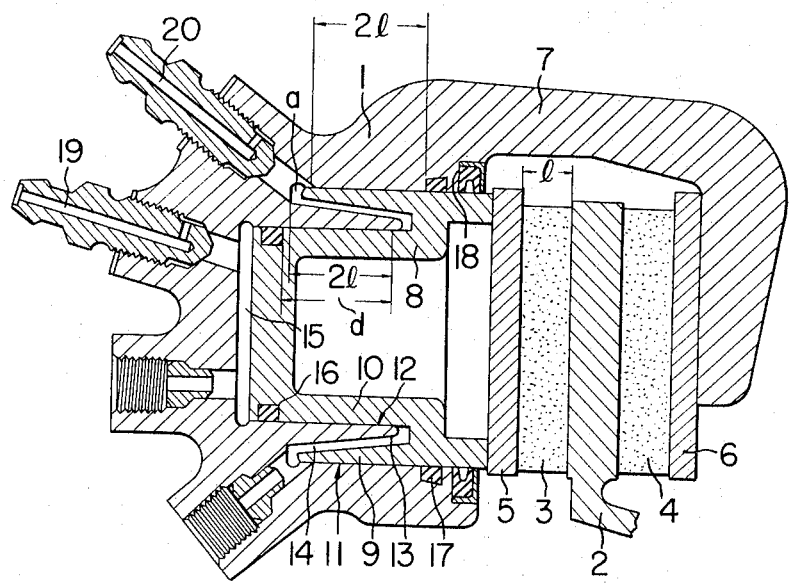
FIG. 1 is a view, sectioned in vertical, of an example of a wheel cylinder according to the present invention.

With reference now to the drawings and more particularly to FIG. 1 thereof; a cylinder 1 is secured so as to be slidable rightwardly and leftwardly on a fixed member of a chassis. The device is provided with a disk 2 which is adapted to rotate with the wheel and is disposed between friction pads 3 and 4 which are provided with back-plates 5 and 6 respectively. In braking the wheel, the friction pads 3 and 4 serve to abut against the disk 2 from both sides thereof. A yoke 7 is extended rightwardly from the cylinder 1, and the inside of the end portion of the yoke is adapted to push the back-plate 6 of the pad 4. The right end portion of a piston 8 is in contact with the back-plate 5 of the pad 3. Therefore, as described below, when the piston 8 is pushed in a right direction by hydraulic pressure, the piston 8 directly pushes the pad 3, but the reaction force caused by this pushing action pressurizes the oppositely positioned pad 4 through the cylinder 1 and the yoke 7 thereby accomplishing the brake action mentioned above. During this period, the cylinder 1 freely slides, as required, on the fixed member (not shown) of the chassis thereby to simultaneously pressurize both surfaces of the disk 2 at equal pressure, so that the braking action can be carried out without giving any distortion to the disk 2. Described above is the above-mentioned members and braking action corresponds to a well known construction of the disk brake system.

FIG. 1 explains the present invention applied to the disk brake system, but the application of the present invention is not limited to the disk brake system only.

The piston 8 comprises an annular portion 9 inside of which a cylindrical portion 10 is provided to protrude. The piston 8 is slidably fitted at its annular portion 9 in the large diameter hole 11 of the cylinder 1, while the cylindrical portion 10 is slidably fitted in a small diameter hole 12 of the cylinder. The wall of the small diameter hole 12 is extended rightwardly thereby to form an annular portion 13 between the annular portion 9 and the cylindrical portion 10 of the piston 8 so that both the annular portion of the piston 8 and the annular portion of the cylinder 1 are overlapped. It will be seen that the ring-shaped part or annular portion 9 of the piston 8 and the annular portion of the cylinder 1 are constructed so that they are mutually inserted into each other whereby a tapered chamber 14 is provided. The construction as described above provides two pressure chambers 14 and 15 with the aid of seals 16 and 17. Hydraulic pressures, each of which is generated in each respective system, are respectively, applied to the pressure chamber 14 from a master cylinder (not shown) separately provided and to the pressure chamber 15 from the other master cylinder (not shown), whereby the dual brake systems are completed. A reference numeral 18 indicates aa dustseal. The dual brake systems are to ensure safety in a braking operation. In other words, even if one of the dual brake systems mentioned above were broken, the other of the dual brake systems would complete the necessary braking operation to attain safety, and it would not be necessary to establish, between the pressure chambers 14 and 15, the relationship of compensating for the loss-stroke of the piston with said loss-stroke being charged partially by the pressure chamber of the broken system. The relationship mentioned above is one of the specific features involved in the rigid type wheel cylinder. However, the wheel cylinder of this type becomes subject to another problem as wear on a pad increases. Therefore, it has been impossible to shorten the length of the cylinder. On the contrary, as described below, the present invention makes it possible to shorten the length of the wheel cylinder.

Let it be assumed the $l$ is the thickness worn during a period from time of new use of a pad to the time of disuse thereof; the wear length of two pads will be $2l$ in total. Consequently, displacement corresponding to $2l$ is present relatively between the cylinder 1 and the piston 8 during the usable period of the pads. Since it is required to maintain the two pressure chambers 14 and 15 oil-tight throughout the change of said displacement, sliding portions corresponding to at least $2l$ should be provided for both the cylinder and the piston respectively.

In a conventional cylinder, a cylindrical portion 10 is extended by $2l$ leftwardly from line $a$ shown in FIG. 1, and therefore the cylinder also is extended leftwardly as much as accommodating the thus extended length of the cylindrical portion 10. Accordingly, the whole length of the cylinder becomes correspondingly larger in size. On the contrary, in the present invention, both the annular portions are overlapped so that the required length $2l$ is within the overlapped portion $d$, and therefore the whole length of the cylinder can be made to be much shorter than the conventional case. The reference numerals 19 and 20 show holes for draining bubbles.

Figure 2:
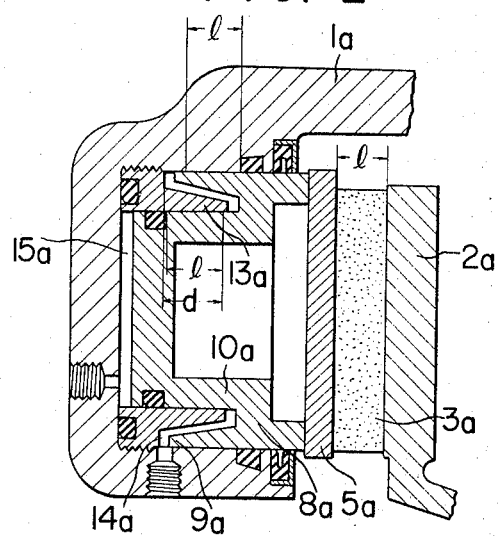
FIG. 2 is a sectional view, sectioned in vertical, of another example of the present invention.

FIG. 1 shows a floating type cylinder, while FIG. 2 illustrates a cylinder of a type in which the cylinder is fixed onto the fixed portion of a chassis. A cylinder is shown on one side of a disk 2a. In this example, an annular portion 13a is formed to be screwed into the internal bottom surface of a cylinder 1 thereby to facilitate working on the wheel cylinder. The cylinder is of a fixed type and necessitates a sliding length as much as a worn length $l$ of a pad on one side. Therefore, $d$ should be correspondent to $l$. This example is same as the example of FIG. 1 in construction and function except that described above.

Figure 3:
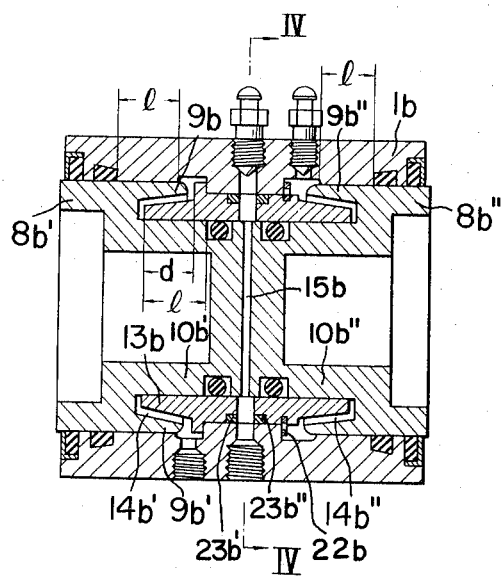
FIG. 3 is a sectional view, sectioned in vertical, of a further example according to the present invention.
Figure 4:
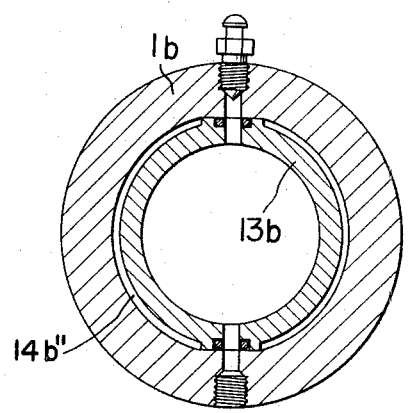
FIG. 4 is a view sectioned along a line IV—IV of FIG. 3.

FIGS. 3 and 4 illustrate another example which comprises a fixed cylinder 1b with both open ends. A pair of pistons 8b' and 8b'' having annular portions 9b' and 9b'' and cylindrical portions 10b' and 10b'' all of which are constructed in a manner similar to that in FIG. 1, are oppositely and expandably fitted inside the cylinder 1b. A sleeve 13b corresponding to the annular portion 13 is fixed on the cylinder 1b by means of a snap-ring 22b, which results in the miniaturization of the cylinder itself in the same way as the example of FIG. 1. The miniaturization of the cylinder is a subject matter of the present invention. Even if the sleeve 13 and the cylinder 1b are formed into one uit, the formation is obviously included in the subject matter of the present invention. Thus, in the same way as in FIG. 1, pressure chambers 14b', 14b'' and 15b are formed and sealing members 23 b' and 23b'' are arranged so as to separate a pressure chamber 15b from the pressure chambers 14b' and 14b''. As apparent from FIG. 4, the pressure chambers 14b' and 14b'' are made so as to be communicated to each other.

In this cylinder assembly, a master cylinder pressure introduced to the pressure chambers 14b', 14b'' and 15b serves to oppositely push away a pair of pistons 8b' and 8b'' in the same way as in FIG. 1, as a result of which brake elements carry out brake action.

Figure 5:
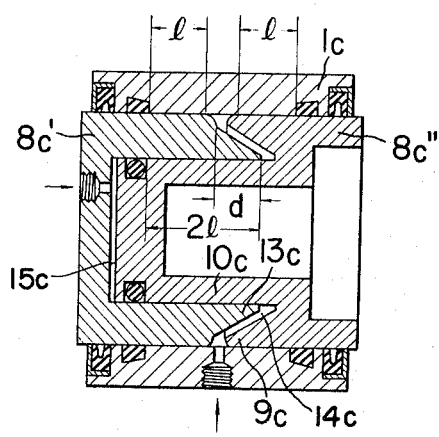
FIGS. 5 and 6 are sectional views, sectioned in vertical, of still further examples according to the present invention.

FIG. 5 shows still another example, according to the present invention, in which a pair of pistons 8c' and 8c'' are fitted in a cylinder 1c in such a way that two pistons 8c' and 8c'' are oppositely pushed away so as to operate respective brake elements. The piston 8c'' is constructed in the same manner as the piston 8 of FIG. 1, and has an annular portion 9c and a cylindrical portion 10c; while the piston 8c' has an annular portion 13c which corresponds to the annular portion 9c and to the annular portion 13 of FIG. 1. The annular portion 9c of the piston 8c'' and the annular portion 13c of the piston 8c are formed to be overlapped thereby to form a pressure chamber 14c.

Figure 6:
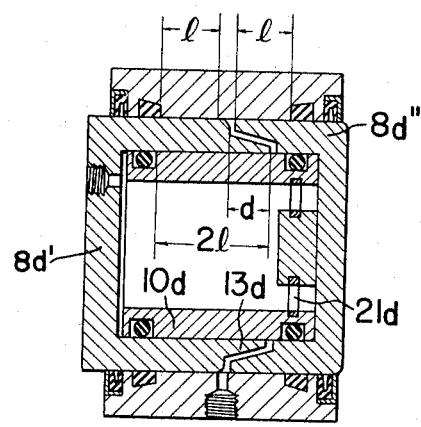

A pressure chamber 15c is provided between the base of the cylindrical portion 10c and the base of piston 8c'. It will be seen that ring-shaped parts 13c and 9c of the pistons 8c' and 8c'' are constructed so that they are mutually inserted into each other whereby a tapered chamber 14c is provided, In a further example, according to the present invention shown in FIG. 6; a cylindrical portin 10d is made to be separate from a pair of pistons 8d' and 8d'' and is secured on the piston 8d'' by means of a snap-ring 21d thereby to facilitate working on the cylinder. The snap-ring 21d is engaged with a projection formed on the piston 8d''. Other constructions of the example shown in FIG. 6 are same as those in FIG. 5.

As apparent from the above description, the present invention has advantageous features that the whole length of a wheel cylinder can be shortened, a brake device can be made smaller, and the weight of the members under the spring device of an automobile can be made lighter.

While a few examples of the invention have been illustrated and described in detail, it is particularly understood that invention is not limited thereto.

What I claim is:

1. A wheel cylinder in a hydraulic brake system of a vehicle, including a cylinder member having an inner wall and, an annular portion to define large and small diameter bores, at least one movable member slidably mounted within said bores, said at least one movable member being provided with a ring-shaped part having an outer wall slidably fitted in said larger diameter bore and a cylindrical part slidably fitted in said smaller diameter bore, a ring-shaped hydraulic pressure chamber being defined between said annular portion of said cylinder member and said ring-shaped part of said movable member and connected to one of dual master cylinders, a cylindrical hydraulic pressure chamber being defined between said cylindrical part of said movable member and said annular portion of said cylinder member and connected to the other of said dual master cylinders, a first sealing member disposed between said annular portion of said cylinder member and said cylindrical part of said movable member, and a second sealing member disposed between the inner wall of said cylinder member defining said large diameter bore and the outer wall of said ring-shaped part of said movable member, said annular portion of said cylinder member and said ring-shaped part of said movable member constituting said ring-shaped hydraulic pressure chamber being shaped and arranged so as to be mutually entered from one to the other of said annular portion and said ring-shaped part, said hydraulic pressure chambers enveloping the total cross-sectional area of the bores.

2. The wheel cylinder in a hydraulic brake system of a vehicle as claimed in claim 1, in which said cylinder member is provided with a first inlet port for connecting said one of said dual master cylinders to said ring-shaped hydraulic pressure chamber, a first bleed port connected to said ring-shaped hydraulic pressure chamber, a second inlet port for connecting the other of said dual master cylinders to said cylindrical hydraulic pressure chamber, and a second bleed port connected to said cylindrical hydraulic pressure chamber.

3. The wheel cylinder in a hydraulic brake system of a vehicle as claimed in claim 1, in which said cylinder member is slidably supported in a fixed member of a chassis and is provided with a part adapted to press one braking element in the case of braking, and said movable member being defined as a piston adapted to press the other braking element in said braking case.

4. The wheel cylinder in a hydraulic brake system of a vehicle as claimed in claim 1, in which said cylinder member is fixed to a fixed member of a chassis, said movable member consisting of two pistons for pressing two braking elements in the case of braking, and said ring-shaped hydraulic pressure chamber being defined by said annular portion of said cylinder and said ring-shaped parts of said two pistons.

5. The wheel cylinder in a hydraulic brake system of a vehicle as claimed in claim 4, in which a first inlet port in said cylinder member serves to connect said one of said dual master cylinders and said ring-shaped hydraulic pressure chamber, a first bleed port in said cylinder member connected to said ring-shaped hydraulic pressure chamber, a second inlet port in said cylinder member and said annular portion of said cylinder member serves to connect the other of said dual master cylinders and said cylindrical hydraulic pressure chamber, and a second bleed port in said cylinder member and said annular portion of said cylinder member is connected to said cylindrical hydraulic pressure chamber.

6. The wheel cylinder in a hydraulic brake system of a vehicle as claimed in claim 1, in which said annular portion of the cylinder member is extended to be substantially parallel to the inner wall of the cylinder member, the ring-shaped part of the movable member being extendibly disposed between the inner wall and the annular portion, said ring-shaped part and the cylindrical part of said movable member being formed to be mutually entered to each other, the first sealing member being fitted in the outer wall of the cylindrical part of the movable member to cause a hydraulic sealing operation by the cooperation of the first sealing member with the inner wall of the annular portion, the second sealing member being fitted in the inner wall of the cylinder member, and the inner wall of the annular portion and the outer wall of the ring-shaped part of the movable member being mutually penetrated to each other to form the ring-shaped hydraulic pressure chamber.

* * * * *